(12) United States Patent
Tracy et al.

(10) Patent No.: US 7,617,766 B2
(45) Date of Patent: Nov. 17, 2009

(54) BABY FOOD MAKER

(75) Inventors: James Tracy, Attleboro, MA (US);
Augusto Picozza, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 508 days.

(21) Appl. No.: 11/510,014

(22) Filed: Aug. 25, 2006

(65) Prior Publication Data

US 2008/0047439 A1 Feb. 28, 2008

(51) Int. Cl.
*A47J 37/12* (2006.01)
(52) U.S. Cl. .............................. 99/413; 99/339; 99/348; 366/205
(58) Field of Classification Search ............... 99/339, 99/348, 413; 366/205, 147, 314
See application file for complete search history.

(56) References Cited

U.S. PATENT DOCUMENTS

| | | | |
|---|---|---|---|
| 2,501,193 A | 3/1950 | Schulte | |
| 3,480,001 A | 11/1969 | Katzman et al. | |
| 3,585,362 A | 6/1971 | Hoogesteger et al. | |
| 3,892,945 A | 7/1975 | Lerner | |
| 4,544,529 A | 10/1985 | Hoeck | |
| D296,239 S | 6/1988 | David | |
| D323,763 S | 2/1992 | Barrault | |
| 5,213,776 A | 5/1993 | Maniero et al. | |
| D387,239 S | 12/1997 | Johnstone | |
| 5,749,285 A | 5/1998 | Dörner et al. | |
| 5,768,978 A * | 6/1998 | Dorner et al. | 99/348 |
| 5,794,524 A * | 8/1998 | Kemker et al. | 99/348 |
| 6,076,452 A * | 6/2000 | Dessuise | 99/410 |
| 6,170,386 B1 | 1/2001 | Paul | |
| D444,026 S | 6/2001 | Chaudeurge | |
| 6,505,545 B2 * | 1/2003 | Kennedy et al. | 99/331 |
| 6,550,372 B1 * | 4/2003 | Sharples | 99/331 |
| D483,987 S | 12/2003 | Mauch | |
| 6,703,061 B2 * | 3/2004 | Kennedy et al. | 426/510 |
| 6,725,763 B2 * | 4/2004 | Cai | 99/287 |
| 6,861,618 B2 | 3/2005 | Binet et al. | |
| 6,906,289 B2 | 6/2005 | Serres Vives et al. | |
| 6,907,893 B2 | 6/2005 | Eisenberg et al. | |

(Continued)

FOREIGN PATENT DOCUMENTS

WO WO 03/071910 9/2003

(Continued)

OTHER PUBLICATIONS http://www.babysupermall.com/main/products/avt/avt00501.html, "Avent Express Electric Steam Sterilizer".

(Continued)

*Primary Examiner*—Tu B Hoang
*Assistant Examiner*—Hemant Mathew
(74) *Attorney, Agent, or Firm*—Hoffman & Baron, LLP

(57) ABSTRACT

A method and apparatus are provided for steaming and blending food products such as baby food. The apparatus includes a base including a steam chamber and a drive shaft. A container assembly can be mounted to the base in an inverted position for steaming the food and in an upright position for blending the food. The apparatus may further include a baby bottle sterilizing unit and a bottle warmer.

26 Claims, 18 Drawing Sheets

U.S. PATENT DOCUMENTS

| | | |
|---|---|---|
| 7,002,111 B2 | 2/2006 | Bauer |
| 2002/0001650 A1* | 1/2002 | Kennedy et al. ............ 426/523 |
| 2003/0024402 A1* | 2/2003 | Rosa ........................... 99/467 |
| 2003/0070558 A1* | 4/2003 | Kennedy et al. .............. 99/403 |
| 2004/0114457 A1* | 6/2004 | McGill ....................... 366/199 |
| 2004/0146621 A1* | 7/2004 | Kennedy et al. ............ 426/523 |
| 2004/0237798 A1 | 12/2004 | Payne |
| 2006/0150821 A1* | 7/2006 | Paul et al. .................... 99/279 |
| 2006/0157463 A1 | 7/2006 | Wiele et al. |

FOREIGN PATENT DOCUMENTS

| | | |
|---|---|---|
| WO | WO 2005/094648 | 10/2005 |

OTHER PUBLICATIONS http://www.babyage.com/products/503_avent_avent_express_bottle_and_ baby_food_warmer.html, "Avent Express Bottle and Baby Food Warmer".

* cited by examiner

BABY FOOD MAKER

BACKGROUND OF THE INVENTION

1. Field of the Invention

The field of the invention relates to methods and assemblies for steaming and blending food products.

2. Brief Description of the Related Art

Various appliances have been designed for steaming and/or blending food products. Baby food is often made by steaming food products and then placing them in a blender. While two separate appliances, namely a steamer and a blender, can be employed for making pureed food such as baby food, some appliances have been designed that provide both such functions. U.S. Pat. Nos. 6,076,452 and 6,550,372 and WO 2005/094648 A1 disclose food processing devices that allow the user to first steam food products and then blend them in the same device.

Appliances have also been designed for sterilizing baby bottles. Some sterilizers intended for this purpose have employed steam. U.S. Pat. Nos. 4,544,529 and 5,213,776 disclose such sterilizing appliances.

Baby bottle warmers are commercially available for warming baby bottles or other vessels containing baby food. WO 03/071910 A1 discloses a food warmer that employs steam to warm a food containing vessel.

SUMMARY OF THE INVENTION

The present invention is directed to an apparatus and a method for steaming and blending food products. An apparatus in accordance with the invention includes a base having a support for a container. A steam chamber is supported by the base and includes a steam exit port. A heater provides heat to the steam chamber. A drive shaft is rotatably supported by the base and an electric motor is provided for rotating the drive shaft. The apparatus further includes a container assembly including a container, and a lid removably coupled to the top end portion of the container. A steam inlet passage is provided in the container for allowing the entrance of steam generated within the steam chamber. A blade assembly is disposed within the container. The container assembly is mountable to the base support in a first upright orientation wherein the bottom end portion thereof adjoins the base support and the drive shaft operatively engages the blade assembly. The container assembly is also mountable to the base support in a second inverted orientation wherein the steam exit port is in fluid communication with the steam inlet passage.

An assembly for steaming and blending food products is further provided in accordance with the invention. The assembly includes a base for supporting a removable container, a steam chamber within the base, a steam exit port in fluid communication with the steam chamber, an electric heater for providing heat to the steam chamber, a drive shaft rotatably mounted to the base, an electric motor for rotating the drive shaft, and a container assembly having a bottom end portion, an open top end portion and a lid removably securable to the open top end portion. A blade assembly is disposed within the container. A steam inlet passage is provided for admitting steam into the container. Complementary locking elements on the base and container assembly are provided such that the container assembly can be removably locked to the base in a first upright position where the drive shaft is coupled to the blade assembly and a second inverted position where the steam inlet passage is in fluid communication with the steam exit port. The assembly can preferably be used for additional purposes such as warming baby bottles and/or sterilizing baby bottles and/or other food containers.

A method in accordance with the invention includes the steps of providing a base including a steam chamber, a steam exit port in fluid communication with the steam chamber, a drive shaft, and an electric motor for rotating the drive shaft. A container assembly is provided that includes a container having a bottom end portion and an open top end portion, a lid removably mounted to the top end portion, and a steam inlet passage. A blade assembly is positioned within the container. The method further includes introducing food into the container, placing the container on the base in an inverted position such that the steam inlet passage communicates with the steam exit port, causing the steam chamber to produce steam, the steam entering the container through the steam inlet passage and steaming the food, removing the container assembly from the base after the food has been steamed, replacing the container on the base in an upright position so that the drive shaft is coupled to the blade assembly, and actuating the motor to cause rotation of the drive shaft and coupled blade assembly, thereby blending the food.

A food preparation assembly is further provided in accordance with the invention. The assembly includes an apparatus for steaming and blending food products. The apparatus includes a base having a support for a container, and a steam chamber supported by the base and including a steam exit port. A heater is included for providing heat to the steam chamber. The base includes a drive shaft. An electric motor is supported by the base and operatively associated with the drive shaft. Further provided is a container assembly including a container, a steam inlet passage, and a lid removably coupled to a top end portion of the container, the container assembly is selectively mountable to the base support. A blade assembly is disposed within the container. A bottle holder is selectively mountable to the base. The bottle holder includes a steam inlet passage communicable with the steam exit port and an interior chamber of the bottle holder. An external receptacle for receiving at least the bottom end of a baby bottle, and an opening within the bottle holder for allowing steam to flow from the chamber into the receptacle. A sterilizing unit is selectively mountable to the base including a sterilization chamber for holding a plurality of bottles. The sterilization chamber is in fluid communication with the steam exit port when mounted to the base.

DETAILED DESCRIPTION OF THE INVENTION

The detailed description which follows is directed to a preferred embodiment of the invention, and is not intended as limiting the invention to the specific structures disclosed. The invention should instead be construed in accordance with the claims that are appended.

Figure 1:
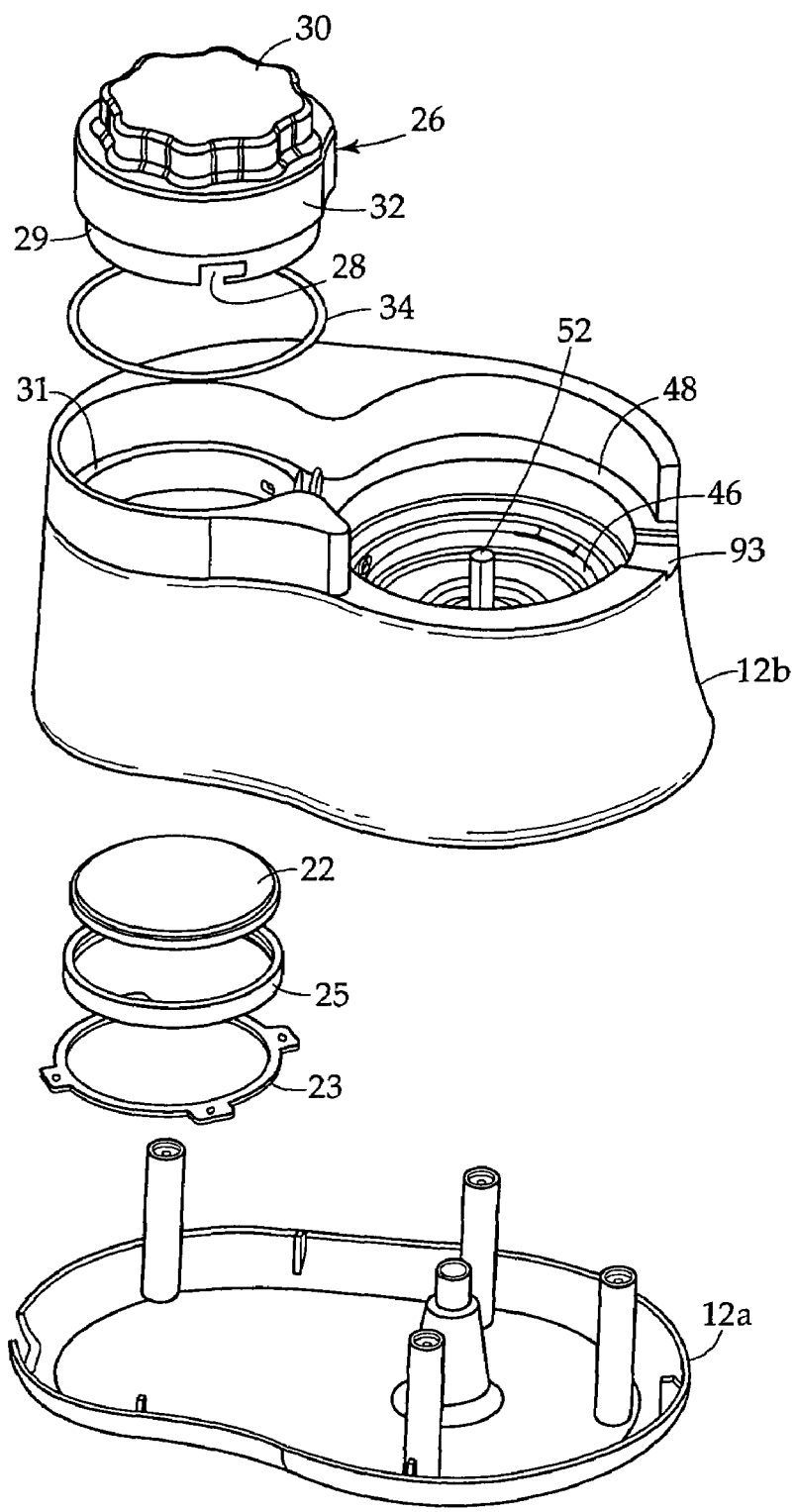
FIG. 1 is an exploded, perspective view of a base assembly for a baby food maker in accordance with the invention.
Figure 2:
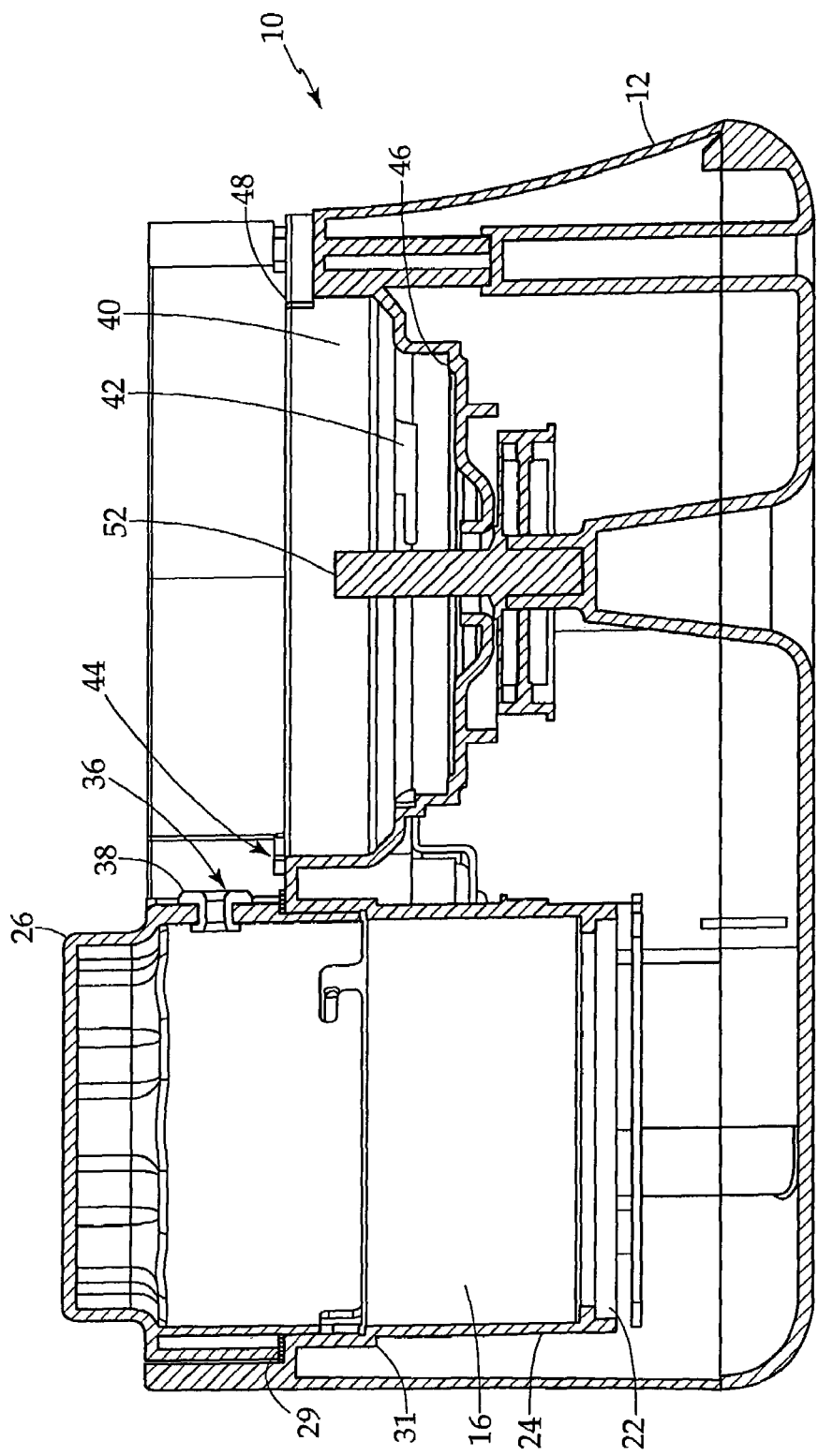
FIG. 2. is a sectional view thereof.

With reference to FIGS. 1 to 4, an apparatus 10 for steaming and blending food products is provided. The apparatus can be used for making baby food or other types of pureed foods. As discussed below, it can also be adapted for sterilizing or warming baby bottles or other food containers. A base 12 is provided for supporting a removable container 14, a steam chamber 16, and a motor 18 for driving a blade assembly 20 or other blending device. Referring specifically to FIGS. 1 and 2, the base 12 defines an enclosure into which the steam chamber 16 extends. The base is comprised of a bottom cover 12a and housing 12b. The steam chamber is defined in part by a vessel 24 having a metal bottom that readily conducts heat. The entire vessel can be formed of plastic or metal. The vessel is preferably permanently secured to the base 12. An electric heater, such as a resistance heater 22, is positioned in close proximity to the vessel. The heater is supported by a bracket 23. A gasket 25 is provided between the heater and bracket. The vessel 24 is substantially cylindrical and has an open top end. The steam chamber further comprises a cover 26 that is removably mounted to the top end of the vessel. A bayonet-type locking mechanism is employed to secure the cover 26, including bayonet-type slots 28 in the cover 26. The cover includes a top wall 30 and a skirt 32 extending downwardly from the top wall. The skirt is indented near the top wall 30 and includes an undulating surface to facilitate application and removal of the cover. The lower portion of the skirt is generally cylindrical, but includes a shoulder 29 that rests upon an annular surface 31 of the base 12. A gasket 34 is positioned between the cover's shoulder 29 and the base to prevent the escape of steam. A steam exit port 36 is provided in the skirt 32. A resilient grommet 38 is secured to the port 36, portions of which extend beyond the skirt walls. These portions secure the grommet in place. The portion of the grommet adjoining the outer surface of the skirt 32 provides a sealing mechanism for an adjoining vessel, as described below. The cover 26 and base are designed such that the steam exit port 36 is oriented in a selected direction when the cover is properly secured.

Figure 3:
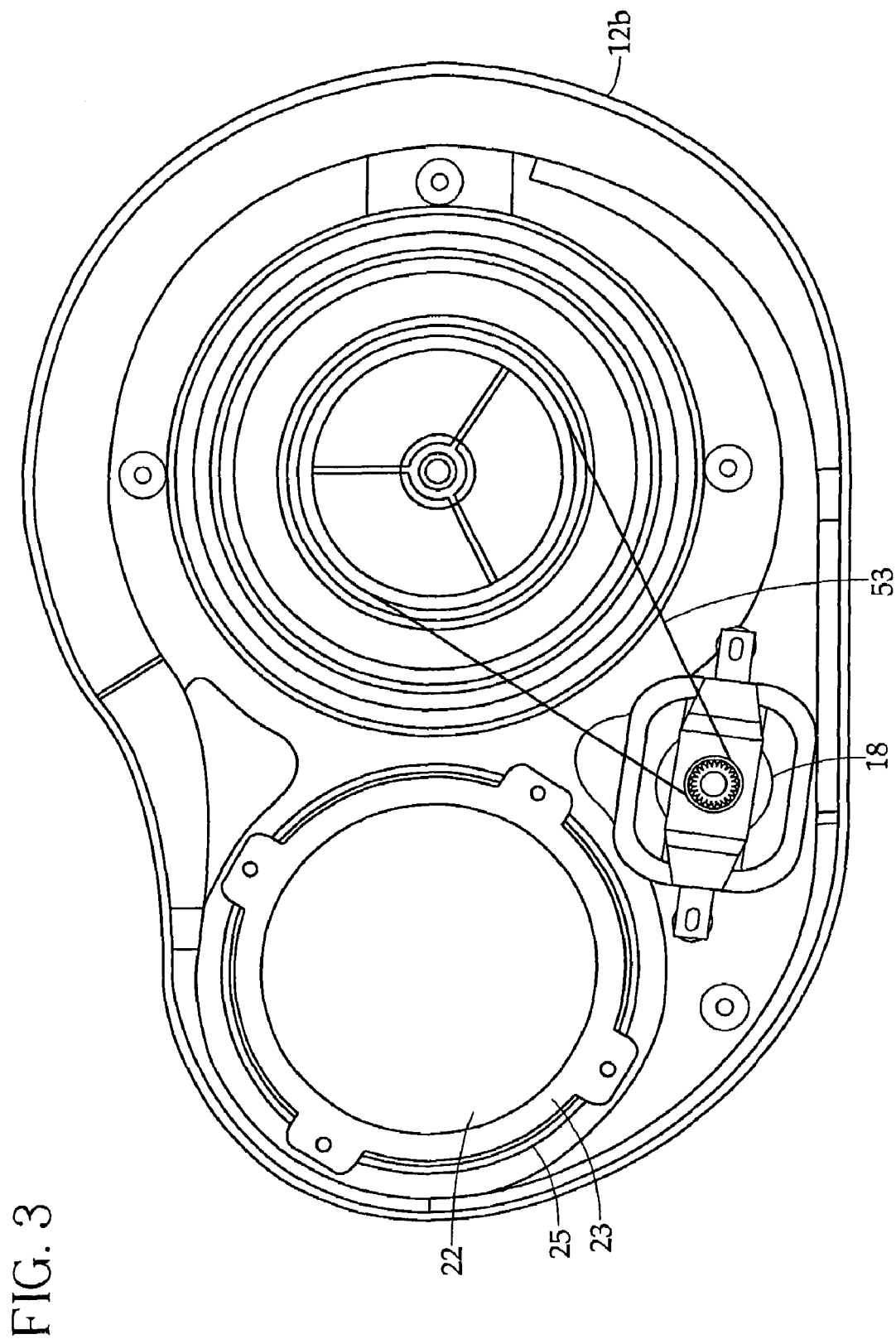
FIG. 3. is a bottom view thereof with the bottom cover removed.

A receptacle 40 for a portion of the container 14 is defined by the base 12 such that the container can be mounted to the base in side by side relation to the steam chamber. A first locking structure 42 in the form of one or more slots is provided at a first elevation in the wall bounding the receptacle 40. A second locking structure 44 is provided at a higher elevation. Both locking structures 42, 44 are designed to interact with complementary locking structures located on the container 14 and container lid 50, respectively. The receptacle 40 includes a plurality of levels or tiers. The bottom tier 46 has a relatively small diameter while the upper tier 48 has a larger diameter. Each tier includes a generally annular horizontal surface. The electric motor 18 is mounted beneath the receptacle 40. A drive shaft 52 is operatively associated with the motor and extends into the receptacle 40. The drive shaft rotates about its longitudinal axis when the motor is actuated. As shown in FIG. 3, the drive shaft is driven by a belt 53 mounted to two pulleys, one associated with the motor output shaft and the other with the drive shaft 52 for the blade assembly 20.

Figure 4:
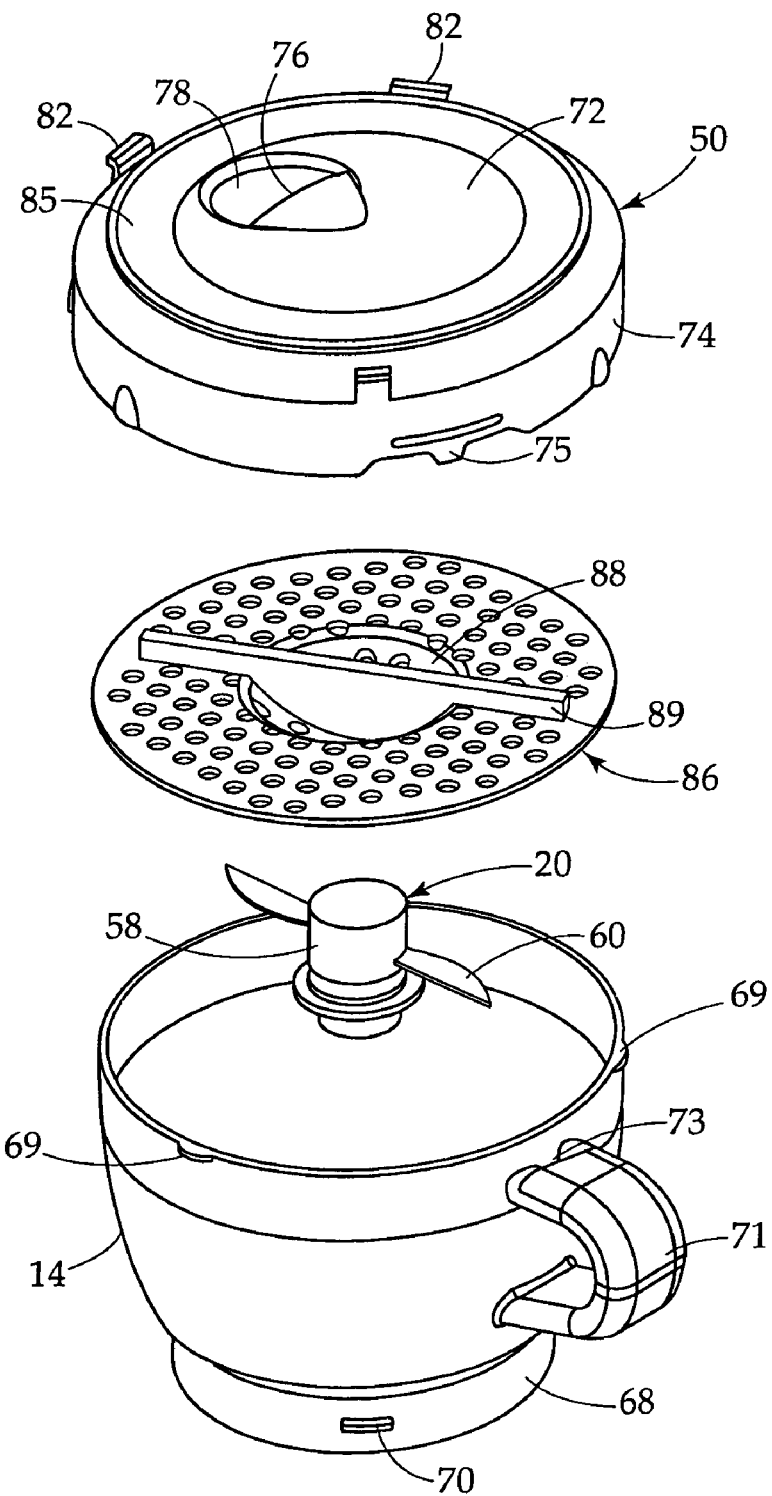
FIG. 4 is an exploded, perspective view of a container assembly and associated components for use with the base assembly.
Figure 5:
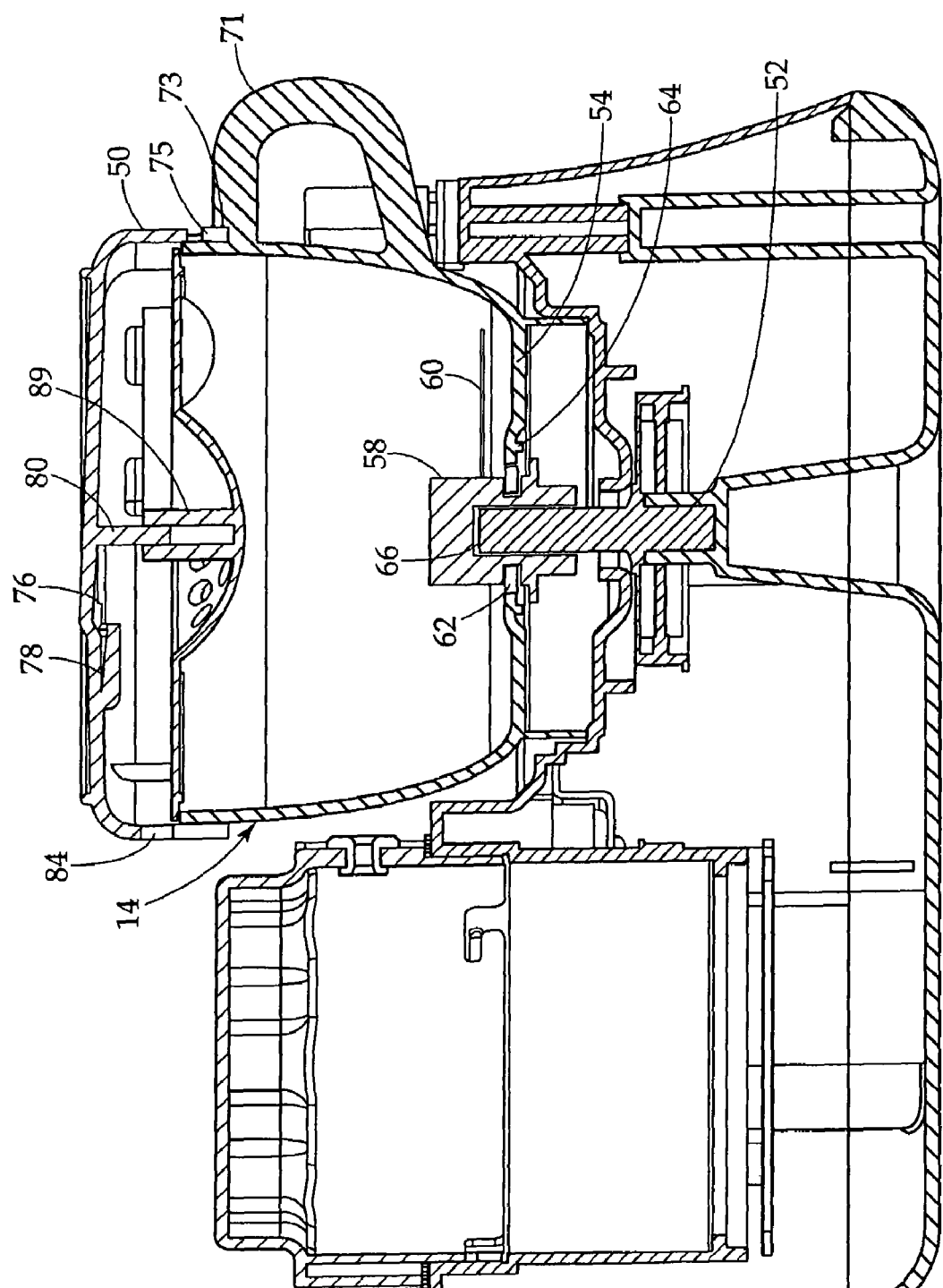
FIG. 5 is a sectional view showing the container assembly mounted to the base assembly in a first orientation for blending food.
Figure 6:
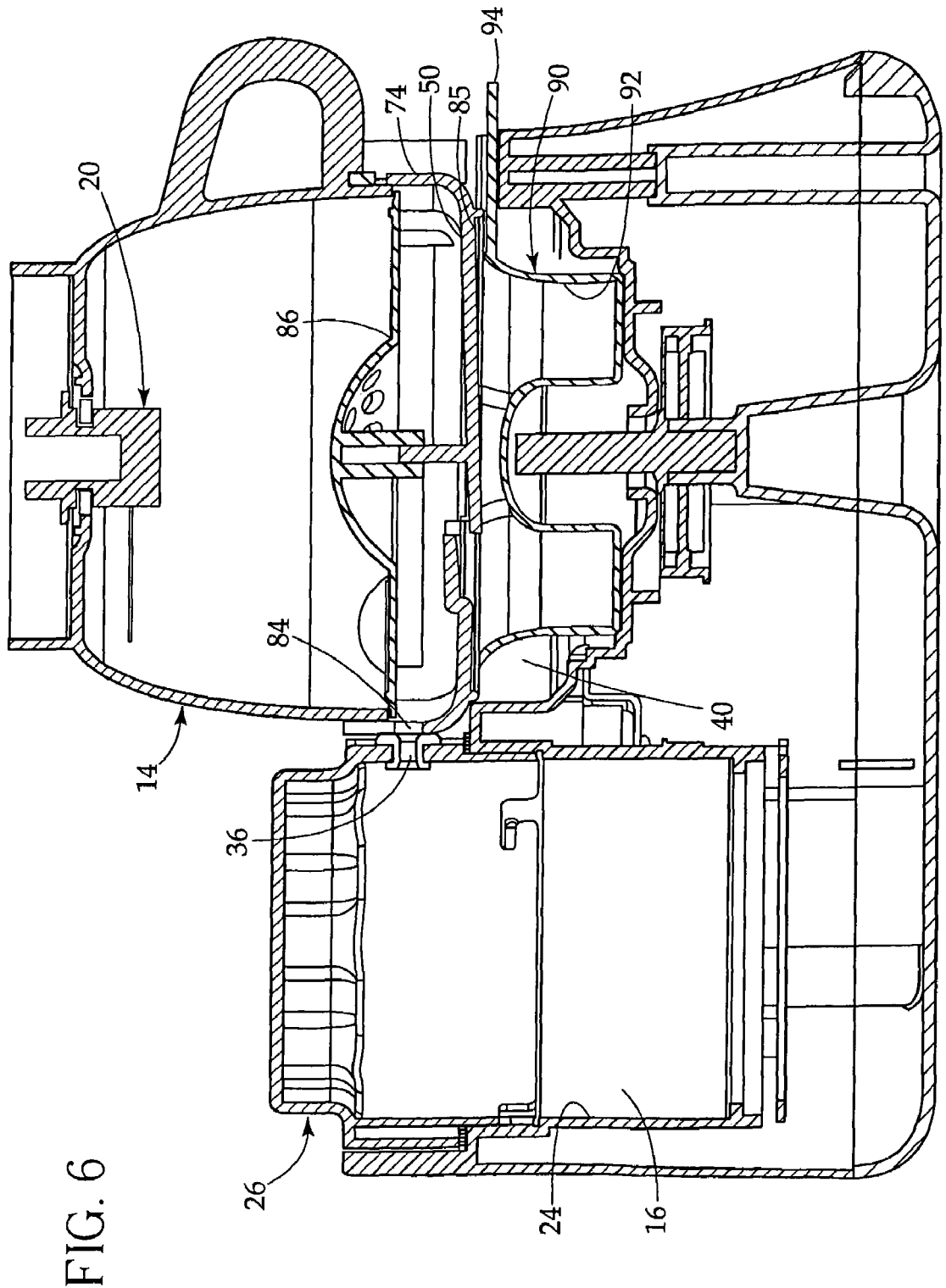
FIG. 6. is a sectional view showing the container assembly mounted to the base assembly in a second, inverted orientation for steam cooking food.

With reference to FIGS. 4 to 6, the container 14 includes a bottom wall 54 having a central opening as shown in FIGS. 5 and 6. The blade assembly 20 is disposed within the container 14. In the embodiment shown in FIGS. 4-6, the blade assembly may be mounted to the bottom wall 54. The blade assembly 20 includes a coupling 58 to which a plurality of blades 60 are mounted. The coupling 58 extends partially below the bottom wall of the container and partially above it. The middle portion of the coupling 58 is slotted for receiving portions of the bottom wall 54 adjoining the central opening. It is removably secured to the bottom wall of the container. An annular seal 62 is provided between a shoulder portion of the coupling and an annular ring 64 extending downwardly from the bottom wall. The coupling includes a central passage 66 configured to receive the drive shaft 52. The passage is defined by a multi-sided wall surface. The drive shaft includes corresponding surfaces whereby the coupling and the blades are caused to rotate upon rotation of the drive shaft.

The container includes an annular base portion 68 extending below the bottom wall 54 as well as beyond the bottom of the coupling 58. A plurality of projections 70 extend radially outwardly from the outer surface of the base portion 68. The projections are positionable within the bayonet-type slots comprising the first locking structure 42 when the container is mounted to the base in a first orientation as shown in FIG. 5. They allow the container to be removably locked to the base 12 by rotating the container once the projections are within the slots. The apparatus 10 can be used for blending when the container is locked in this position. The base portion also allows the container to be placed upon a horizontal surface without danger of tipping over. A handle 71 extends from a side wall of the container. A slot 73 may be formed in the upper wall of the handle 71 to receive a tab 75 depending from the lid. The engagement of the tab 75 in slot 73 helps releasably retain the lid in the closed position. The top end of the container 14 includes three rounded projections 69 that extend radially outwardly, as shown in FIG. 4.

The container lid 50 includes a top wall 72 and a generally cylindrical skirt 74 that is integral with the top wall 72. A slotted opening 76 is formed in the top wall. A ramp 78 formed integrally with the top wall of the lid extends below the opening 76. The top wall is formed so that, when inverted, liquid within the lid will tend to flow towards the slotted opening. A partition wall 80 extends from the bottom surface of the top wall and bisects the interior portion of the lid. A plurality of projections 82 extend radially outwardly from the lid and are engageable with slots in the base 12 comprising the second locking structure 44. A steam inlet passage 84 extends through the skirt 74. When the container is coupled to the base in an inverted orientation as shown in FIG. 6, the steam inlet passage 84 is in fluid communication with the steam exit port 36. The resilient grommet forms a seal around the steam exit port and the portion of the skirt 74 surrounding the steam inlet passage as it engages the outer surfaces of the container lid 50 and the cover 126 of the steam chamber 16. The skirt may further include one or more steam vent openings (not shown). An annular gasket 85 is provided on the upper surface of the lid 50.

A perforated screen 86 is removably coupled to the container lid 50. The screen 86 is comprised of a thin, planar body portion and a centrally located dome-like depression 88. A pair of parallel walls 89 extend from the top surface of the screen and define a slot that receives the outer end of the partition wall 80 of the lid 50. The screen is thereby frictionally coupled to the lid and mostly positioned within the skirt 74 thereof.

With reference to FIG. 6, a condensate collector 90 may be positioned within the receptacle 40. The condensate collector includes a vessel 92 having a radially outwardly extending handle 94 that extends outside the base 12 through a notch 93 in the upper tier 48 when the vessel is within the receptacle 40. The bottom wall of the vessel forms a hollow center protrusion that accommodates the top end of the drive shaft 52 (FIG. 1). As shown in FIG. 6, the lid gasket 85 forms a seal between the condensate collector 90 and the lid to prevent steam from entering the condensate collector. The lid gasket forms a seal between the condensate collector 90 and the lid 50 to prevent steam from entering the portion of the receptacle 40 outside the condensate collector.

Figure 7:
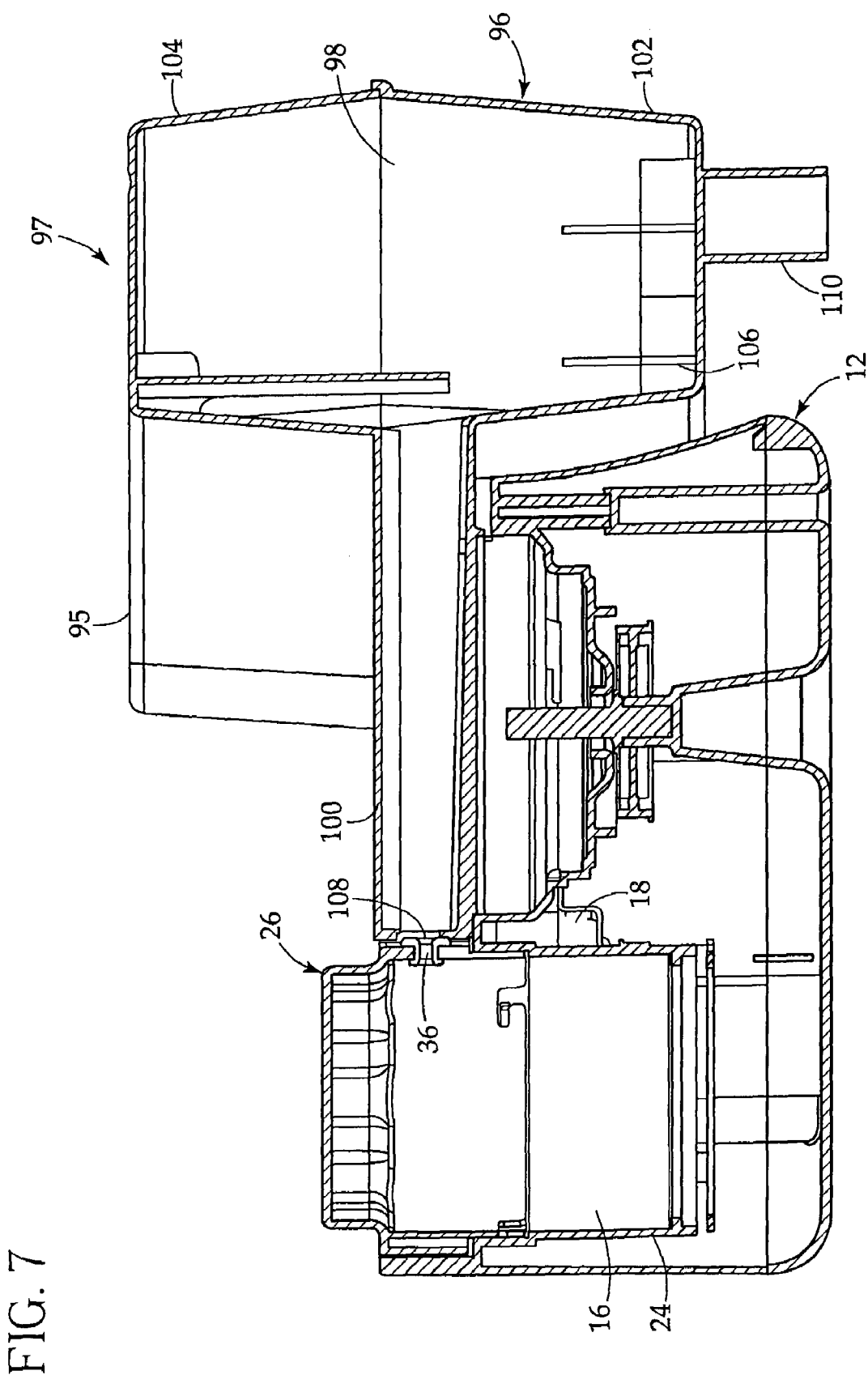
FIG. 7 is a sectional view showing a sterilizing unit mounted to the base assembly.

Referring now to FIG. 7, the apparatus 8 can be adapted for sterilizing baby bottles or other food containers. A sterilizing unit 97 may be provided and include a housing assembly 95 having a generally U-shaped housing 96. The housing assembly 95 includes a sterilization chamber 98 for holding a plurality of baby bottles. A housing extension 100 is connected to, and is preferably integral with the housing 96. The housing assembly includes a base unit 102 and a removable cover 104. The base unit 102 includes supports 106 for bottles that allow them to be mounted upside down. The supports further allow steam to enter the bottles. The base unit preferably includes eight supports 106, though it can be configured to hold a greater or lesser number of bottles and/or other types of food containers. The portion of the base unit 102 comprising the bottom of the housing extension 100 includes a steam inlet port 108 that adjoins the steam exit port 36 when mounted to the base 12. It further includes locking members (not shown) similar to those provided on the container lid 50 for securing it to the slots in the base 12 comprising the second locking structure 44 (FIG. 2). One or more legs 110 extend from the bottom wall of the base unit 102 for supporting the housing 96. When the housing assembly is coupled to the base 12 and the cover 104 is mounted to the base unit 102, steam can flow from the exit port 36 into the housing extension 100 and then into the sterilization chamber 98. One or more vents (not shown) can be provided for venting the sterilization chamber.

Figure 8:
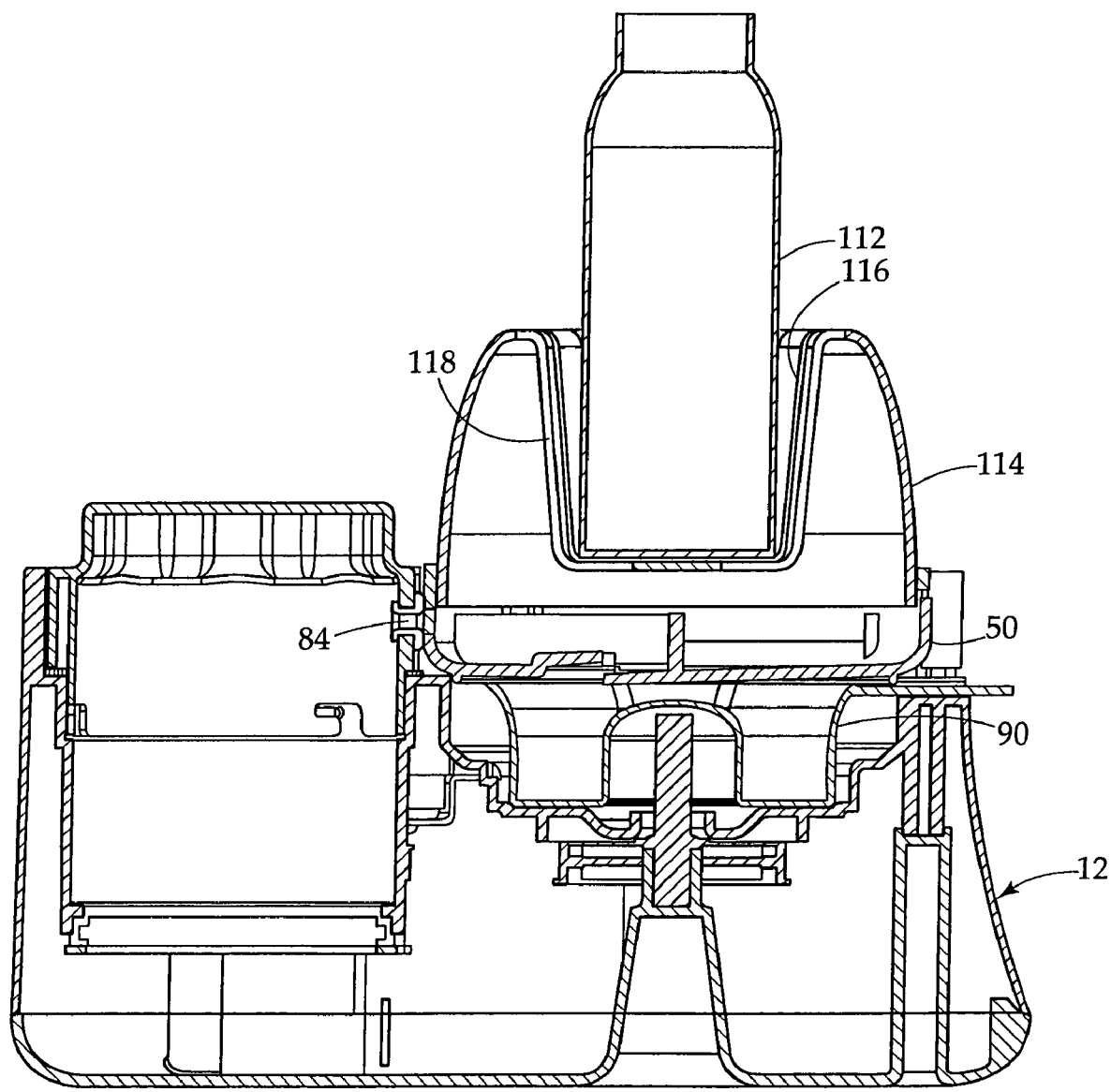
FIG. 8 is a sectional view showing a bottle warmer mounted to the base assembly.
Figure 9:
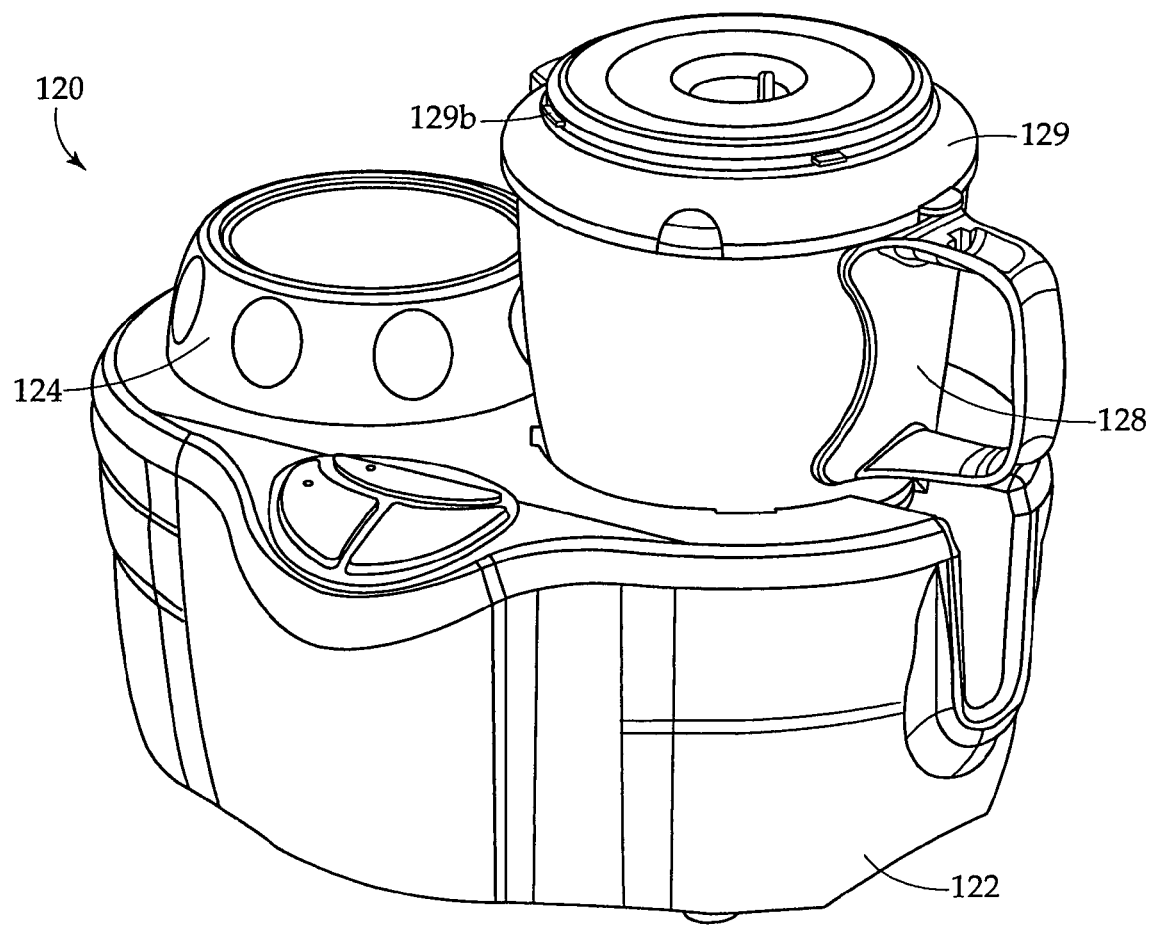
FIG. 9 is a perspective view of an alternative embodiment of baby food maker in accordance with the present invention.

FIG. 8 shows the apparatus as configured for warming a baby bottle 112. A bottle holder 114 is provided that includes a first open end to which the lid 50 can be secured. The opposite end of the bottle holder is configured as a receptacle 116 for the bottle. The receptacle is bounded by a generally conical side wall of the holder 114 as well as a bottom wall. Both the side wall and the bottom wall include openings 118 that allow steam to enter the receptacle and thereby provide heat to the bottle contained partially therein. The bottle holder 114 and associated lid 50 are mounted to the base in the same manner as the container 14 is mounted thereto. Steam enters the bottle holder through the steam inlet passage 84 in the lid 50 and travels upwardly through the openings 118 into the receptacle 116 where it heats the bottom portion of the bottle.

The condensate collector 90 is preferably employed during the bottle warming process to collect the water formed as the steam condenses about the bottle or the inner surfaces of the holder 114.

An alternative preferred embodiment of the present invention is shown in FIGS. 9 to 16. The baby food maker 120 of this embodiment is similar to the embodiment described above. With specific reference to FIGS. 9-11, a base 122 includes a steam chamber 124 and a receptacle 126 for receiving a removable container 128. The container 128 is selectively covered by a lid 129. The base includes a motor 130 for driving a blade assembly 132 disposed within the container 128. Container 128 may include a separate blade assembly 132 that is removable from the container to help facilitate cleaning.

The steam chamber 124 includes a vessel 134 for holding a liquid. The chamber is in communication with a heating element 136 which is capable of turning the liquid, such as water, into steam. The vessel 134 is covered by a removable cover 140 which may be secured by bayonet-type locking mechanism of the type described above. Cover 140 includes a top wall 142 and skirt 144. A steam exit port 146 may be disposed on skirt 144.

Figure 11:
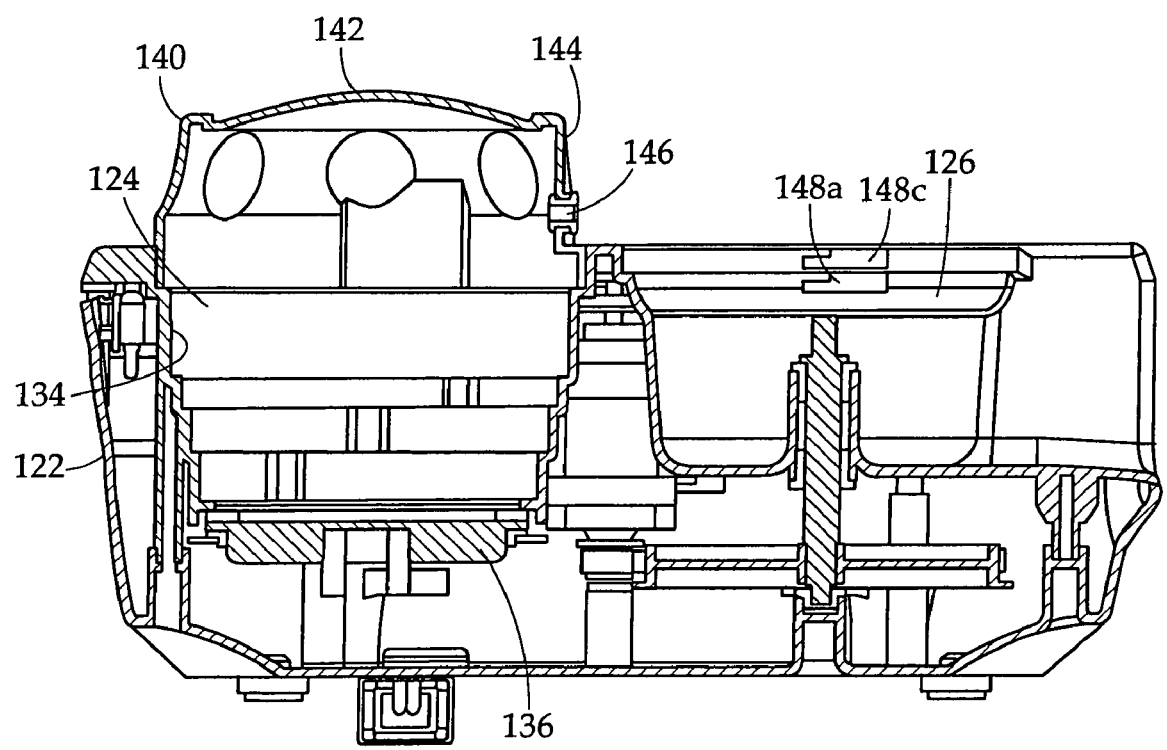
FIG. 11 is a cross-sectional view of the base of FIG. 9.
Figure 12:
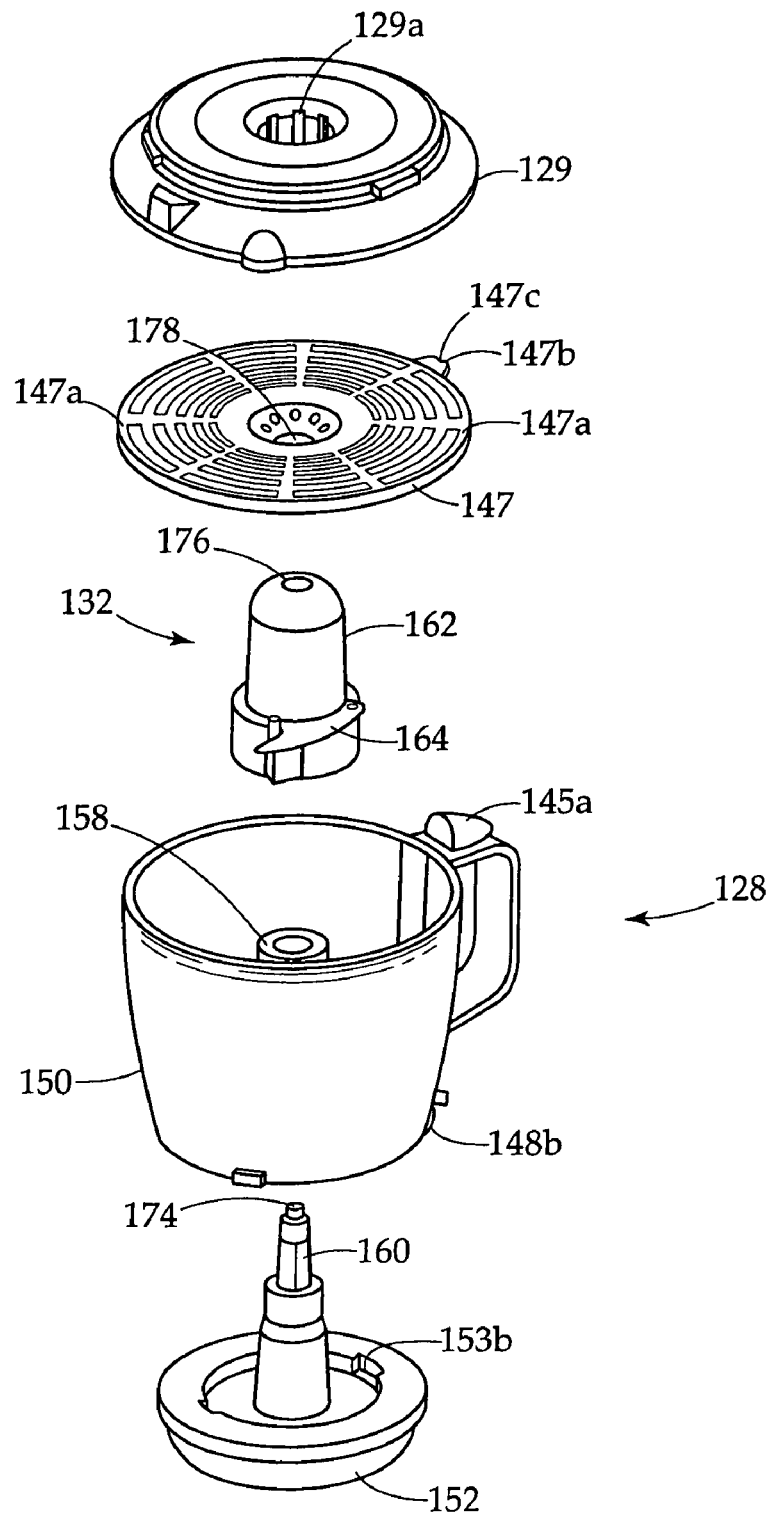
FIG. 12 is an exploded view of the container of FIG. 9.
Figure 13:
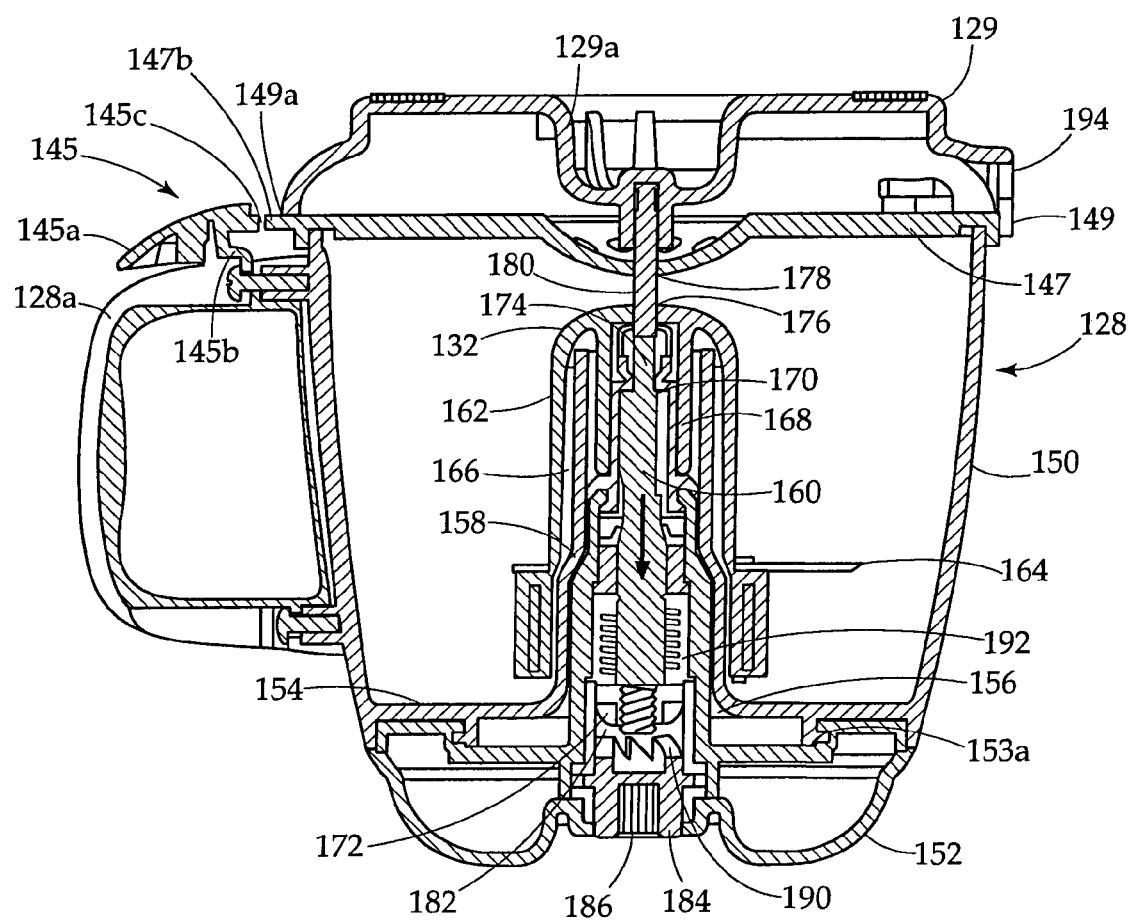
FIG. 13 is a cross-sectional view of the container of FIG. 12.

With reference to FIGS. 11 to 13, removable container 128, assembled with the lid 129 and blade assembly 132, may be placed within the base receptacle 126 in a first orientation such that the container 128 may perform as a blender for chopping and pureeing foods. The container 128 may be removably secured to the base receptacle by way of complementary locking structures 148a on the base (FIG. 11) and 148b on the container (FIG. 12) as described above with respect to the embodiment shown in FIG. 5. Alternatively, the container 128 may be placed on base 122 in a second orientation, inverted with respect to the first orientation, such that lid 129 sits in receptacle 126. In the second orientation, the contents of the container may be steamed.

Lid 129 may be removably attached to a screen 147 similar to screen 86 as described above. The manner of securement of the screen to the lid may differ from that of the previously described embodiment in that screen 147 may be held in place by way of engagement of the screen perimeter with the inside of lid skirt 149. The engagement may be secured by outwardly projecting tabs 147a (FIG. 12) disposed on the screen 147 which interlock with indentations (not shown) formed on the inner surface of the lid's skirt 149. Screen 147 may be easily removed from lid 129 to facilitate cleaning.

Lid 129 may be secured to the container 128 by way of interlocking structures, such as a bayonet-type connector as in the previously described embodiment, in which the lid is rotated with respect to the container to secure the lid to the container. A latching mechanism 145 may be provided to selectively lock the lid to the container. Preferably, the latching mechanism 145 includes a latch 145a pivotally secured to the handle 128a of the container 128 and biased in a locking position. The biasing may be provided by a section of resilient material 145b. The latching mechanism 145 further includes a projecting member 147b extending from the screen 147. The projecting member 147b extends through a notch 149a formed in lid skirt 149 and beyond the lid skirt 149. The latch 145a includes a locking end 145c which engages the projecting member 147b when the lid is secured to the container 128. When the lid 129 is rotated to the closed position, the projecting member 147b engages the latch 145a and deflects it away from the projecting member. The projecting member 147b includes a notched portion 147c (FIG. 12) which receives the locking end 145c. Once the locking end 145c is positioned within the notch 147c, the latch 145a springs back and the lid 129 may not be rotated until the user depresses the latch 145a. The depression of the latch 145a results in the locking end 145c being moved away from the projecting member 147b and out of notch 147c, thereby permitting the lid 129 to be rotated and removed from the container 128.

With reference to FIGS. 12 and 13, container 128 may include a housing 150 with a bottom portion 152 removably attached to the housing 150. The attachment may be achieved by way of cooperating bayonet-type connectors on the housing 153a (FIG. 13) and on the bottom portion 153b (FIG. 12) in a manner known in the art. The bottom portion 152 may be removed or attached to the housing 150 by rotating the bottom portion and housing with respect to each other. The housing 150 may include a bottom wall 154 having an opening 156, defined by upwardly extending walls 158. A drive member 160 disposed on the bottom portion 152 extends through the opening 156. The blade assembly 132 is removably securable to the drive member 160. Blade assembly 132 includes a hub 162 and blades 164 extending from the hub. Hub 162 may have an inner annular opening 166, which receives the upwardly extending walls 158. A blade assembly upper end 168 may be rotationally fixed to a drive member upper end 170 such that they will spin together. The connection between the blade assembly upper end 168 and drive member 160 permits the blade assembly to be moved axially relative to the drive member. This may be achieved by way of complimentary configurations of a type known in the art.

Drive member 160 may be operably connected to a clutch mechanism 172 which prevents the blade assembly 132 from turning when the container lid 129 is not secured to the container. The drive member 160 and clutch mechanism 172 may be disposed on the bottom portion 152. Drive member 160 is preferably longitudinally translatable with respect to the bottom portion 152. This translational movement permits the drive member and the blade assembly attached thereto to be disposed in and out of engagement with the motor 130 via the clutch mechanism 172.

In order to move the drive member, the upper end of the drive member 170 may include a post 174 that extends through an opening 176 in the top of the blade assembly 132. Screen 147 may further include an opening 178 to permit a post-like actuator 180 to extend there-through. Actuator 180 is secured to the lid and engages the blade assembly 132 when the lid 129 is properly secured on the container housing and forces the drive member 160 downwardly.

Figure 10:
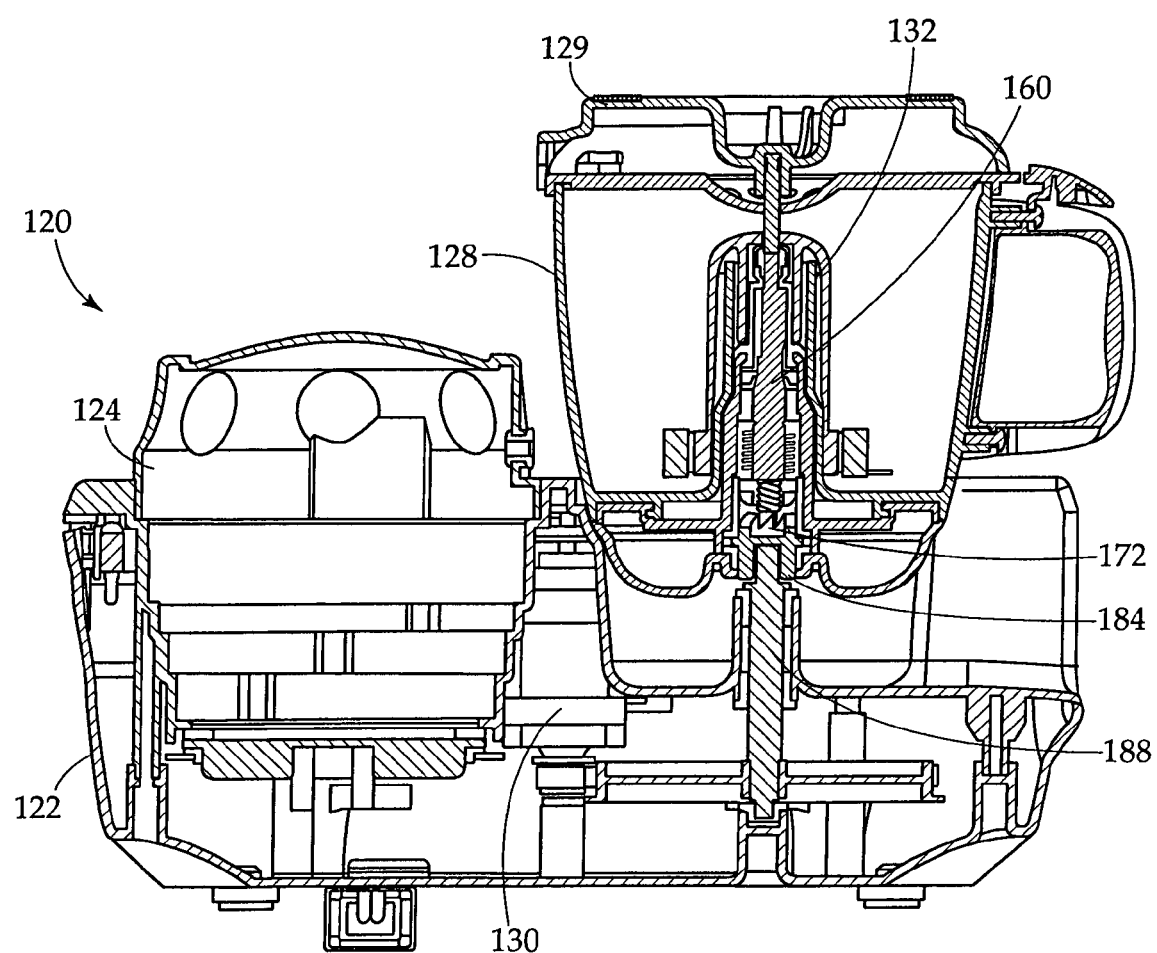
FIG. 10 is a cross-sectional view of the baby food maker of FIG. 9.

Referring additionally to FIGS. 10 and 13, the clutch mechanism 172 may include a first clutch part 182 disposed on the bottom of the drive member. The bottom portion 152 may include a coupling 184 having an opening 186 for receiving a drive shaft 188 operably connected to the motor 130. When the container 128 is secured in the base 122, the drive shaft 188 extends into the opening such that rotation of the drive shaft 188 causes the coupling 184 to rotate. An upper portion of the coupling includes a second clutch part 190. When the drive member 160 is depressed, such as when the lid 129 is secured on the container 128, the first and second clutch parts 182 and 190 engage each other. This causes the drive member 160 and drive shaft 188 to be coupled together. Therefore, rotation of the drive shaft causes the drive member and the blade assembly 132 attached thereto to rotate. In the preferred embodiment, the first and second clutch parts are toothed structures. However, it is within the contemplation of the present invention that other power transferring configurations could be employed.

The drive member 160 is preferably biased upwardly by a spring 192. When the lid 129 is removed from the container 128, the first clutch part 182 moves out of engagement with the second clutch part 190. Therefore, rotation of the drive shaft 188 and the second clutch part 190 does not cause rotation of the blade assembly 132. Accordingly, the lid 129 preferably needs to be secured to the housing 150 in order for the blades 164 to spin.

Figure 14:
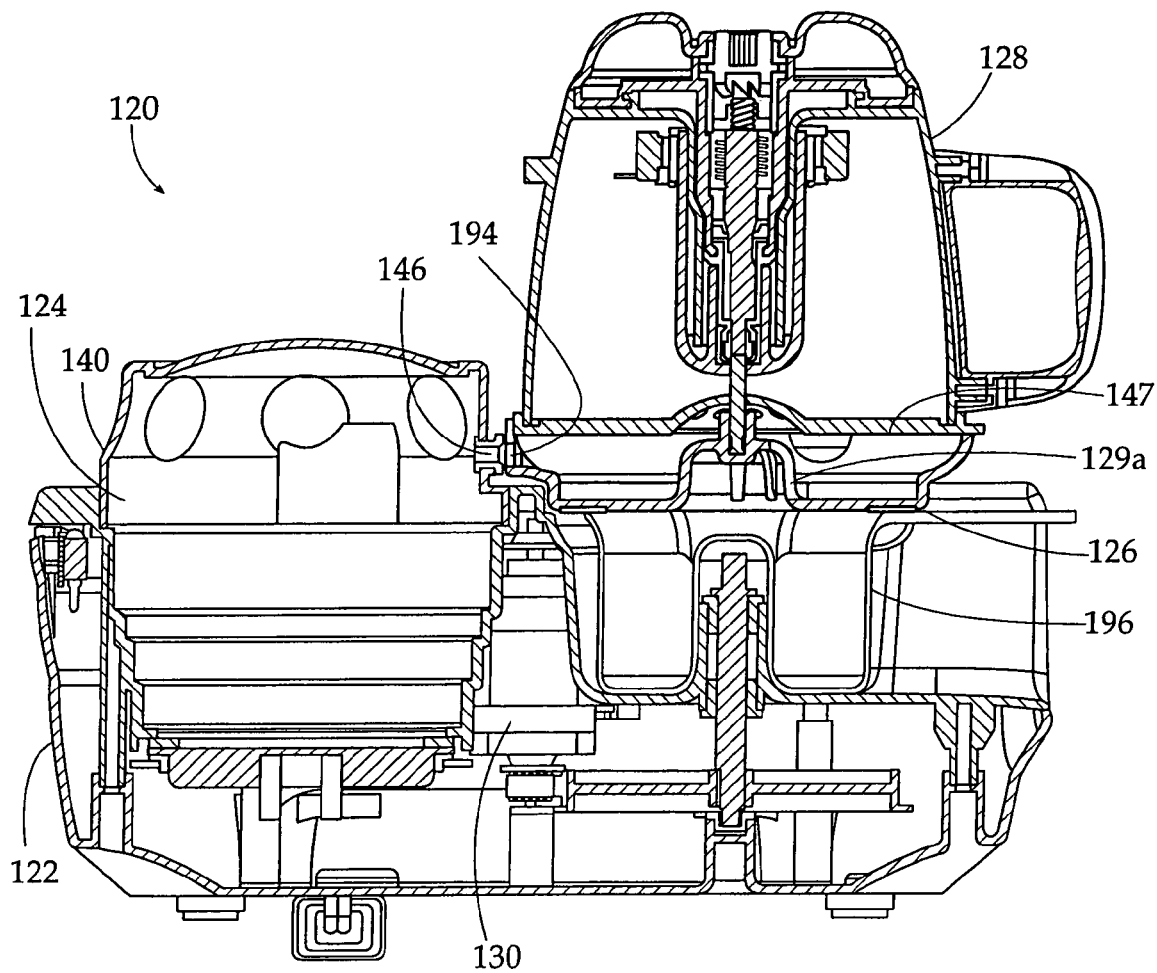
FIG. 14 is a cross-sectional view of the baby food maker of FIG. 9 showing the container in a steaming position.
Figure 14A:
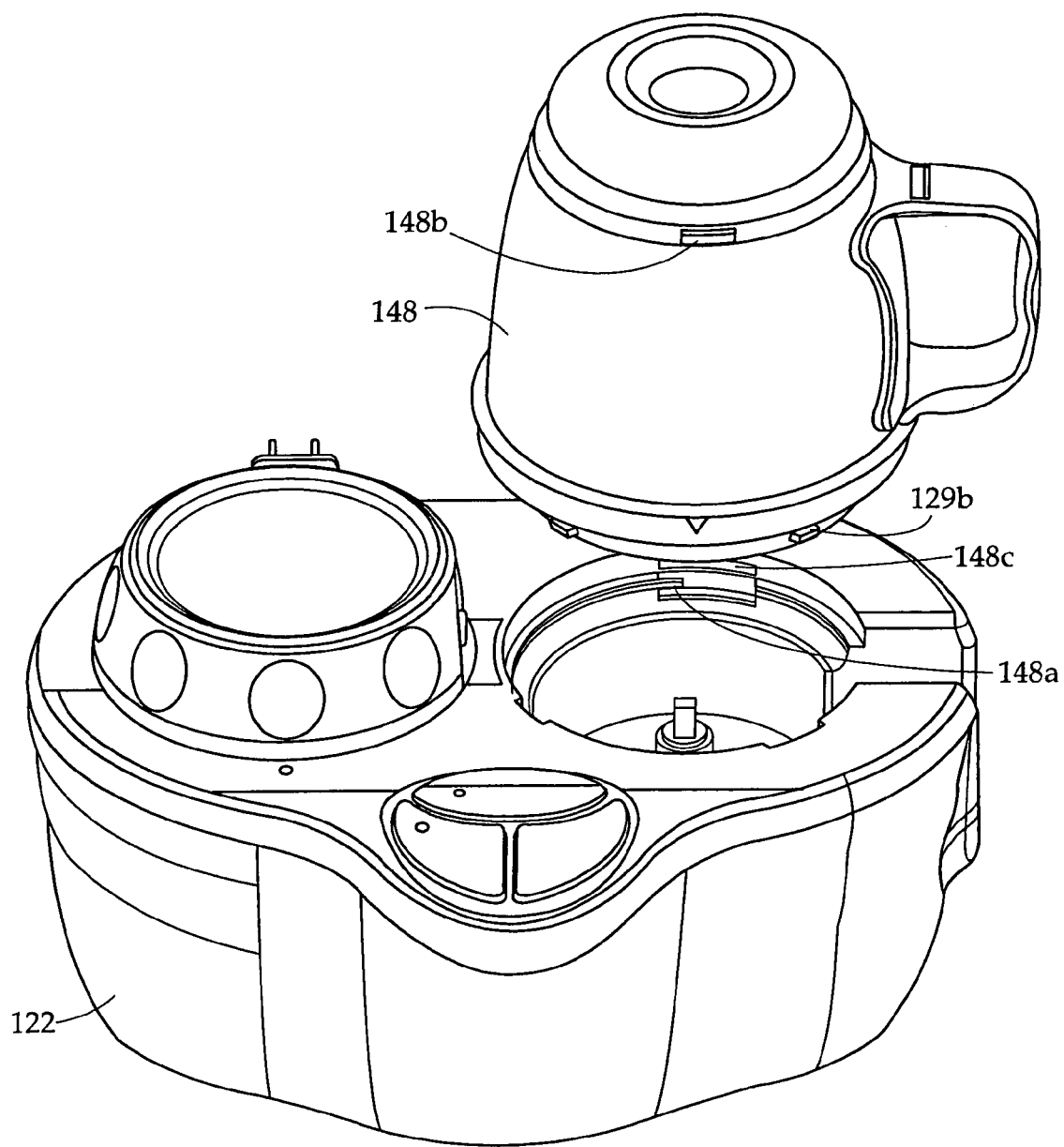
FIG. 14A is a perspective view of the baby food maker showing the container in an inverted position.

With reference to FIGS. 14 and 14A, container 128 may be secured to base 122 in an inverted orientation such that the lid 129 is positioned within the base receptacle 126. The container may be securely held in place by the cooperation of a plurality of radially extending tabs 129b formed on the lid with corresponding locking structures 148c in the base. In this orientation, the steam exit port 146 is in fluid communication with a steam inlet passage 194 leading to the inside of the container 128. Food supported by the screen 147 can be steamed as described above. A condensate collector 196, of a type as described above, may be placed within the receptacle of the base 126 to collect fluid that has condensed and exited out of the vents 129a in the lid 129.

Figure 15:
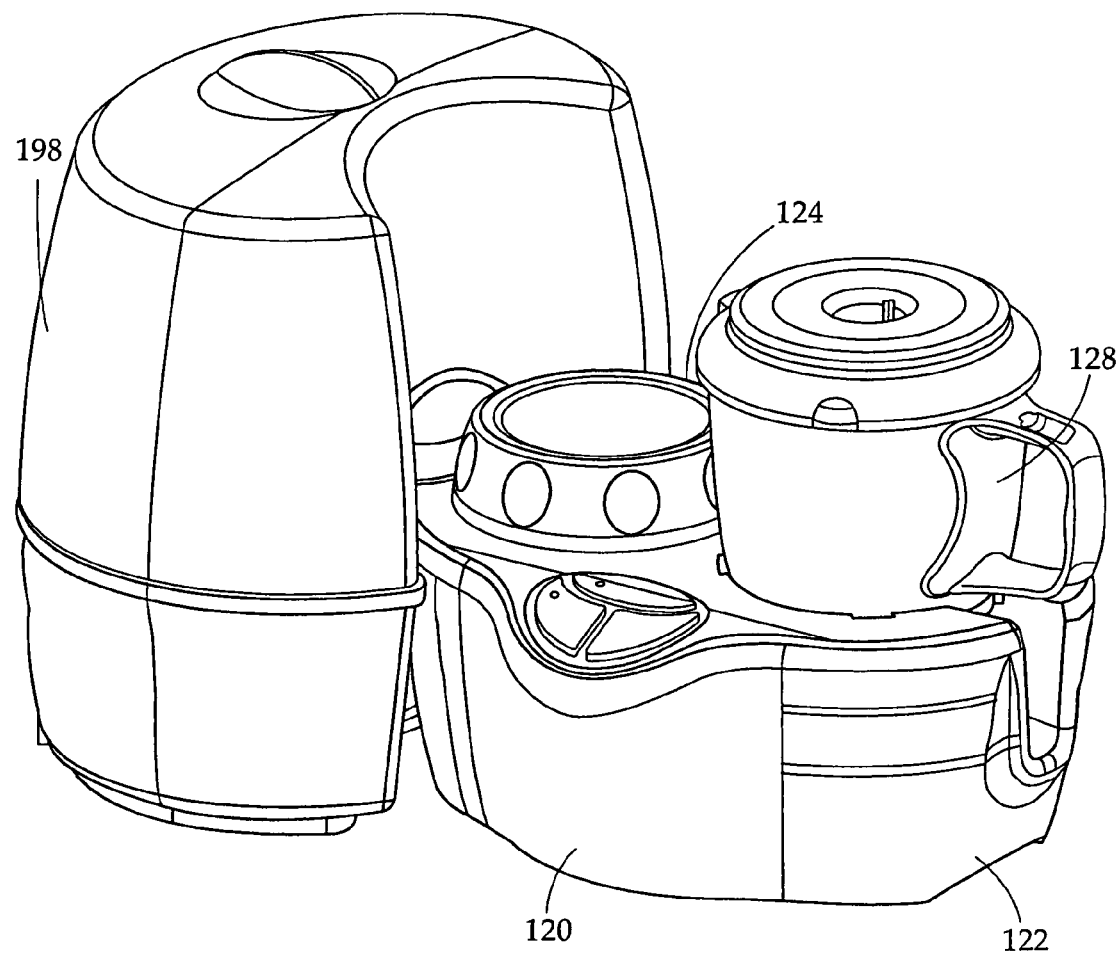
FIG. 15 is a perspective view of the baby food maker of FIG. 9 with a sterilizing unit attached thereto.
Figure 16:
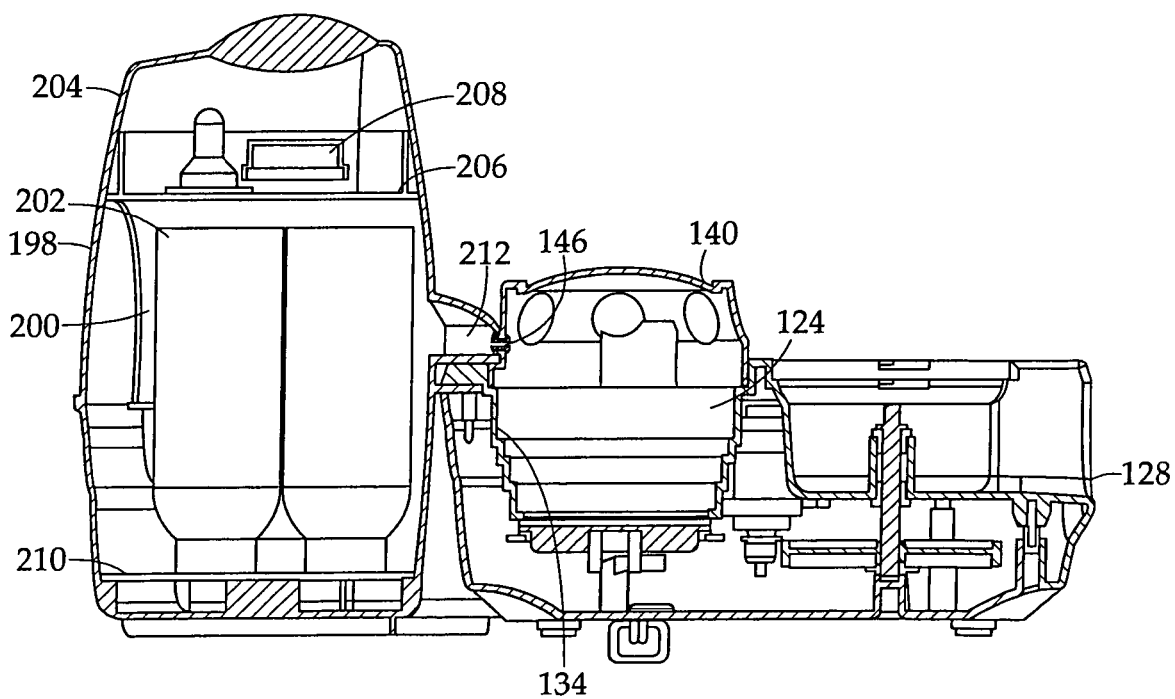
FIG. 16 is a cross-sectional view of the baby food maker with sterilizing unit.

With reference to FIGS. 15 and 16, the preferred embodiment may accommodate a sterilizing unit 198 removably mountable to base 122. Sterilizing unit 198 may include a chamber 200 for accommodating a plurality of baby bottles 202. The sterilizing unit may include a removable portion 204 to permit access to the chamber. The chamber 200 may include a rack 206 for supporting bottle caps and/or nipples 208 so they may be sterilized. The bottles may be placed upon a porous screen 210 such that condensation drains away from the bottles. In the present embodiment, the sterilizing unit 198 may be disposed on base 122 adjacent the steam chamber 124. The steam chamber 124 is preferably disposed between the sterilizing unit 198 and the base receptacle 126. In addition, the presently described embodiment may also accommodate a bottle warmer in a manner as described above with respect to FIG. 8.

Figure 17:
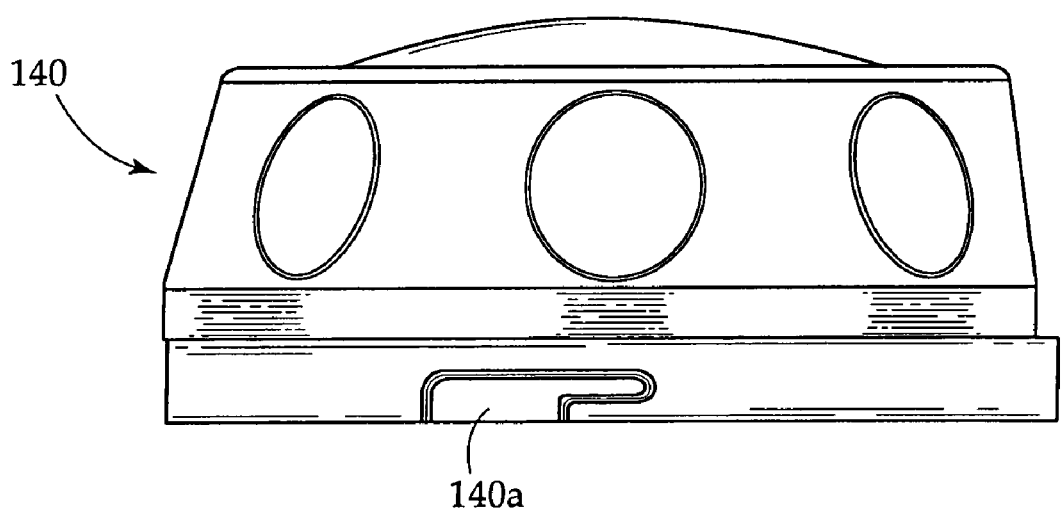
FIG. 17 is a side elevational view of a steam chamber cover of the present invention.

Steam may be selectively communicated to the sterilizing unit 198 and container 128 positioned in receptacle 126 by selective positioning of the steam exit port 146. To achieve this, the cover 140 of the steam chamber is preferably securable on the vessel 134 in a first and second position. In the first position, shown in FIG. 14, the steam exit port 146 is in communication with the inlet passage 194 of container 128 and the steam may be used for steaming the food held in the container 128. In a second position, shown in FIG. 16, the steam exit port 146 is in communication with a steam inlet port 212 of the sterilizing unit 198. Steam may then enter the sterilization chamber 200 and sterilize its contents. The ability to secure the cover 140 in two positions may be achieved by way of bayonet-type locking mechanism as shown in FIG. 17. The cover 140 may include a pair of generally L-shaped slots 140a diametrically disposed thereon. The slots 140a each receive one of a pair of tabs (not shown) extending outwardly from opposite sides of the steam vessel wall. When the cover is rotated the tabs engage the slots 140a thereby securing the cover 140. When the steam is desired to communicate with the container 128, a user may orient the cover 140 such that when it is tightened, the steam exit port 146 aligns with the container 128, as shown in FIG. 14. Alternatively, when the steam is desired to communicate with the sterilizing unit 198, a user would orient the cover 140 such that when it is tightened, the steam exit port 146 would align with steam inlet port 212 on the sterilizing unit 198, as shown in FIG. 16. In this embodiment, the steam is directly provided to the container, bottle warmer, or sterilizing unit, and it does not have to travel through any tubing or along any significant distance.

The operation of the baby food maker in each of the above described preferred embodiments is similar. The operation will now be described with reference to the embodiment set forth in FIGS. 1 to 8, and distinctions between the operation of this embodiment and the alternative preferred embodiment shown in FIGS. 9 to 17 will be noted. The preparation of baby food is begun by cutting uncooked food into pieces of appropriate size. The screen 86 is mounted to the lid 50 and the food is placed in the container 14. The container and lid forming a container assembly. In the alternative preferred embodiment, the blade assembly 132 is positioned in the container on the drive member 160. No further handling of the food is necessary until after it is cooked and ready to be served. The lid 50 is then coupled to the container 14. In the alternative preferred embodiment, the act of securing the lid onto the container causes the drive member 160 to be urged downwardly and the first 182 and second 190 clutch parts to be rotatably locked together as shown in FIG. 13. The condensate collector 90 is positioned in the base receptacle 40 as shown in FIG. 6. The steam chamber vessel 24 is filled with an appropriate amount of water and the cover 26 of the steam chamber is secured thereto as shown in FIG. 6. In the alternative preferred embodiment, the cover 140 of the steam chamber is secured so that the steam exit port 146 is in communication with the steam inlet port 194 of the container 128.

With reference to FIGS. 2 and 6, the container 14 and lid 50 are then mounted to the base 12 such that the lid 50 is supported by the upper tier 48 and the annular gasket 85 forms a seal between the lid and the condensate collector 90. The container and lid are locked to the base by the complementary locking elements 82, 44 on the lid and base, respectively. When locked to the base, the steam exit port 36 is in fluid communication with the steam inlet passage 84. Electrical power is provided to the heater 22, causing the water in the vessel 24 to boil and steam to be generated in the steam chamber 16. The steam exits the steam chamber through the steam exit port 36 and enters the container 14 through the steam inlet passage 84 in the lid 50. The steam travels upwardly through the screen 86, thereby cooking the food. As the steam condenses, it returns to liquid form and drips through the screen 86 and onto the inner surface of the lid 50. Because this surface is inclined in the direction of the slotted opening 76, the condensate flows towards the opening and into the condensate collector. The apparatus may be provided with a timer (not shown) for setting the cooking time. It may also include a circuit (not shown) for terminating power to the heater 22 when the vessel no longer contains water or the water level is below a preset minimum.

Once the food is cooked, the container is removed from the base 12 and the condensate collector 90 is removed from the receptacle 40. The container 14 is placed on the base in the position shown in FIG. 5 such that its base portion 68 rests on the bottom tier 46 of the receptacle 40 and the projections 70 enter the bayonet-type slots of the first locking structure 42. The container is rotated to lock it in position on the base 12. Electrical power is supplied to the motor 18, causing the blade assembly 20 to rotate and blend the contents of the container 14. The blade assembly can be operated at a single speed or multiple speeds, as known in the blender art. Condensate from the collector 90 can be added to the container through the slotted opening 76 in the lid. Once the blending process is complete, the container assembly is removed from the base 12 and the contents removed for consumption or storage. The present invention permits the food to be chopped/pureed or blended and steamed without the food being touched by the user. It is also within the contemplation of the present invention that the container 14 with its food contents may be placed within the base to permit the food to be chopped and then placed in an inverted position in the base so that the food may be steam cooked.

In order to operate the sterilizing unit, in the embodiment shown in FIG. 7, the sterilizing unit 97 is mounted on base 12 such that the base receptacle 40 is disposed between the sterilization unit 97 and the steam chamber 16. The housing extension 100 is positioned adjacent the steam chamber such that the steam exit port 36 aligns with the steam inlet port 108. The sterilizing unit's cover 104 may be removed so that bottles may be placed within the sterilization chamber 98. In the embodiment shown in FIGS. 15 and 16, the sterilization unit 198 is positioned on the base 122 adjacent to the steam chamber 124. The cover 140 may then be positioned and secured on the vessel 134 such that the steam exit port 146 is aligned with the steam inlet port 212. The heating element may then be energized to generate steam which flows into the sterilization chamber.

What is claimed is:

1. An apparatus for steaming and blending food products, comprising:
    a base including a support;
    a container assembly supported by the base;
    a steam chamber supported by the base and including a steam exit port;
    a heater for providing heat to the steam chamber;
    a drive shaft;
    an electric motor supported by the base and operatively associated with the drive shaft;
    the container assembly having a bottom end portion, the container assembly including a container, a steam inlet passage, and a lid removably coupled to a top end portion of the container; and
    a blade assembly disposed within the container,
    the container assembly being mountable to the base support in a first upright orientation wherein the bottom end portion adjoins the base support and the drive shaft is operatively engagable with the blade assembly, the container assembly also being mountable to the base support in a second, inverted orientation such that the container assembly is inverted relative to the base and wherein the steam exit port is in fluid communication with the steam inlet passage.

2. An apparatus as described in claim 1, wherein the support for the container assembly includes a receptacle having a plurality of tiers, a first tier at a first elevation for engaging the bottom portion of the container when the container is in the first upright orientation and a second tier at a second elevation for engaging the lid when the container is in the second, inverted orientation.

3. An apparatus as described in claim 2, wherein the first and second tiers include generally annular surfaces, the annular surface of the first tier having a smaller diameter than the annular surface of the second tier.

4. An apparatus as described in claim 2, including a condensate collector removably positionable within the receptacle beneath the container.

5. An apparatus as described in claim 4, wherein the lid includes a top wall, a skirt extending from the top wall, and an opening in the top wall.

6. An apparatus as described in claim 5, wherein the top wall of the lid includes an inner surface angled towards the opening in the top wall such that liquid within the lid flows towards the opening.

7. An apparatus as described in claim 1, including a screen removably mounted within the lid.

8. An apparatus as described in claim 1, including a housing having a steam inlet passage and containing a chamber for holding baby bottles, the housing being mountable to the base support such that the steam inlet passage of the housing is in fluid communication with the steam exit port.

9. An apparatus as described in claim 1, including a bottle holder mountable to the base support, the bottle holder including a steam inlet passage communicable with the steam exit port and an interior chamber of the bottle holder, an external receptacle for receiving at least the bottom end of a baby bottle, and an opening within the bottle holder for allowing steam to flow from the chamber into the receptacle.

10. An apparatus as described in claim 1, wherein the base and lid include complementary locking elements for securing the container assembly to the base support.

11. An apparatus as described in claim 1, wherein the drive shaft and the blade assembly are selectively operably connectable to each other by a clutch.

12. An apparatus as described in claim 11, wherein the clutch imparts movement of the drive shaft to the blade assembly when the lid is attached to the container and the clutch prevents movement of the drive shaft to be imparted to the blade assembly when the lid is removed from the container.

13. An assembly as described in claim 1, including a sterilizing unit mountable to the base including a chamber for holding a plurality of bottles, the chamber being in fluid communication with the steam exit port.

14. An assembly as described in claim 13, wherein the sterilizing unit is disposed adjacent the stream chamber.

15. An assembly as described in claim 14 wherein the steam chamber is disposed between the sterilizing unit and the container.

16. An assembly as described in claim 15, wherein the steam exit port is selectively positionable between a first position in fluid communication with the container and a second position in fluid communication with the sterilizing unit.

17. An assembly for steaming and blending food products comprising:
a base including a support;
removable container assembly supported by the base;
a steam chamber within the base;
a steam exit port in fluid communication with the steam chamber;
an electric heater for providing heat to the steam chamber;
a drive shaft rotatably mounted to the base;
an electric motor for rotating the drive shaft;
the container assembly having a bottom end portion, an open top end portion, and a lid removably securable to the open top end portion;
a blade assembly disposed within the container;
a steam inlet passage for admitting steam from said steam chamber into the container; and
complementary locking elements on the base and container assembly such that the container assembly is removably lockable to the base support in a first upright position, where the drive shaft is operatively couplable to the blade assembly, and a second inverted position relative to the base wherein the drive shaft is not coupled to the blade assembly and the steam inlet passage is in fluid communication with the steam exit port.

18. An assembly as described in claim 17, wherein the base includes a container receptacle having first and second tiers for supporting the container assembly in the first, upright position and the second, inverted position, respectively.

19. An assembly as described in claim 18, wherein the base includes first and second locking structures, the first locking structure for locking the container assembly in the first, upright position and the second locking structure for locking the container assembly in the second, inverted position.

20. An assembly as described in claim 17, wherein the steam chamber includes a removable cover, the steam exit port extending through the cover.

21. An assembly as described in claim 17, including a condensate collector positionable on the base, a seal for engaging both the lid and the condensate collector when the container assembly is mounted to the base in the second, inverted position, and an opening in the lid for communicating with the condensate collector.

22. An assembly as described in claim 17, including a housing having a steam inlet passage and containing a chamber adapted for holding baby bottles, the housing being mountable to the base such that the steam inlet passage of the housing is in fluid communication with the steam exit port.

23. An assembly as described in claim 17, including a bottle holder mountable to the base support, the bottle holder including a steam inlet passage communicable with the steam exit port and an interior chamber of the bottle holder, an external receptacle for receiving at least the bottom end of a baby bottle, and an opening within the bottle holder for allowing steam to flow from the chamber into the receptacle.

24. An assembly as described in claim 17, including a including a sterilizing unit mountable to the base including a chamber for holding a plurality of bottles, the chamber being in fluid communication with the steam exit port.

25. An assembly as described in claim 24, wherein the steam exit port is selectively positionable between a first position in fluid communication with the container and a second position in fluid communication with the sterilizing unit.

26. An assembly as described in claim 17, wherein the steam chamber includes a removable cap and the steam exit port is disposed on the cap.

* * * * *